G. A. ROGERS.
COMBINED BRAKE AND JACK FOR VEHICLES.
APPLICATION FILED FEB. 18, 1918.
1,311,998.
Patented Aug. 5, 1919.
2 SHEETS—SHEET 1.
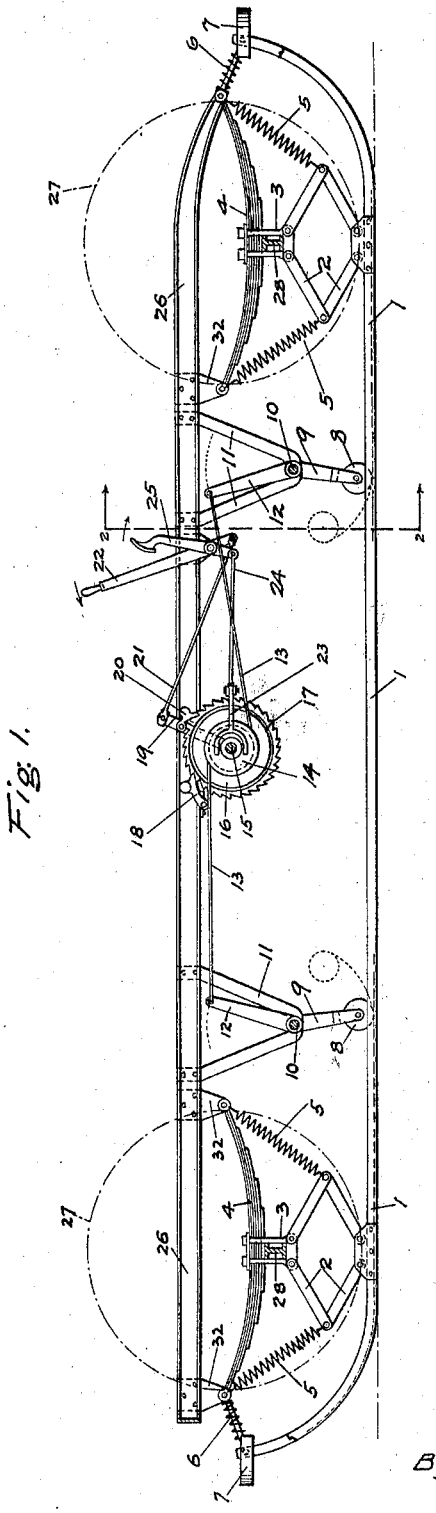
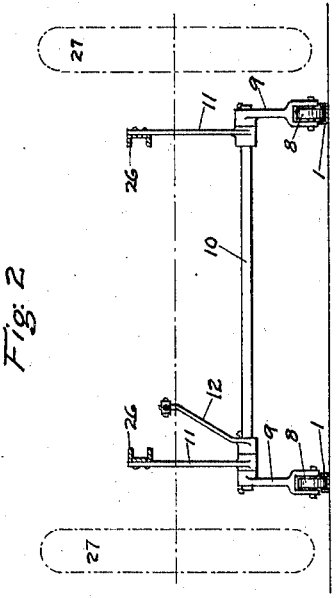
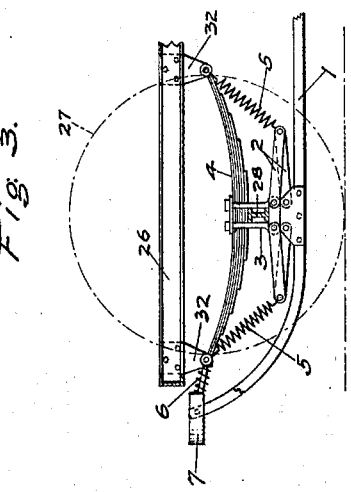
GUY A. ROGERS,
Inventor,
By C. S. Goldberg
Atty.

G. A. ROGERS.
COMBINED BRAKE AND JACK FOR VEHICLES.
APPLICATION FILED FEB. 18, 1918.

1,311,998.

Patented Aug. 5, 1919.

GUY A. ROGERS,
Inventor.

By C. B. Goldberg,
Atty.

UNITED STATES PATENT OFFICE.

GUY ALLEN ROGERS, OF PORTLAND, OREGON.

COMBINED BRAKE AND JACK FOR VEHICLES.

1,311,998.      Specification of Letters Patent.      Patented Aug. 5, 1919.

Application filed February 18, 1918. Serial No. 217,991.

*To all whom it may concern:*

Be it known that I, GUY ALLEN ROGERS, a citizen of the United States, and resident of Portland, in the county of Multnomah and State of Oregon, have invented a new and useful Combined Brake and Jack for Vehicles, of which the following is a specification.

My invention relates to an improvement in a combined brake and jack for vehicles, especially for automobiles and motor trucks in which brake shoes are pressed from the body of the vehicle against the roadway, even until the vehicle wheels are lifted clear of the ground.

The objects of my invention are:

To provide a brake which will stop the vehicle almost instantly without damaging the tires, wheels, engine or other such like important parts; which will reduce skidding on wet or slippery streets to a minimum; which will hold the vehicle even on very steep grades; and finally, which will serve as an ever ready jack.

I attain these objects by the mechanism illustrated in the accompanying drawings in which:

Figure 1 is a vertical longitudinal section through a vehicle showing the brake shoe in action.

Fig. 2 is a section of Fig. 1 along the line 2—2.

Fig. 3 is a portion of Fig. 1 showing the brake shoe in elevated or idle position.

Similar numerals refer to similar parts throughout the several views.

Figure 4:
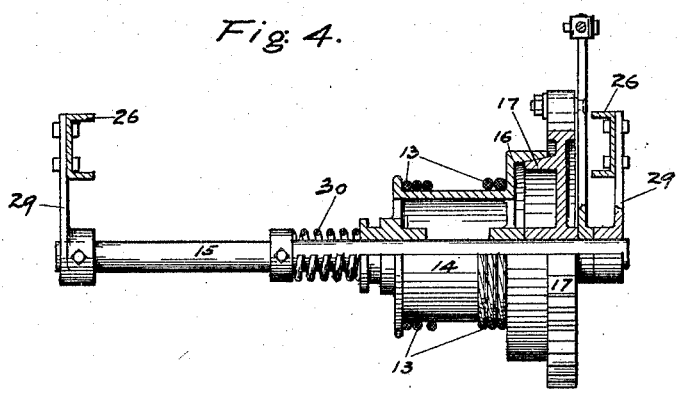
Fig 4 is a transverse section through the vehicle showing the cable drum partly in elevation and partly in section.

Two brake shoes 1, composed of channel irons and extending throughout the length of the vehicle, with their ends curving upward, are located underneath the body of the vehicle within the wheel base. These brake shoes are connected, by means of toggles 2 and axle clamps 3, with the mainsprings 4 of the vehicle. A helical spring 5, between the elbows of the toggles 2 and the ends of the mainsprings 4, will keep the brake shoes 1 normally off the ground.

Rods 6 with their encircling helical springs connect the bumpers 7 with the mainsprings 4.

Within the channels of the brake shoes 1 roll wheels 8, the latter being mounted at the ends of levers 9, the other ends of which are keyed onto shafts 10. The supporting brackets for said shafts are shown at 11. Rocker arms 12, keyed onto shafts 10, connect, by means of cables 13, with the cable drum 14.

This drum may revolve freely on shaft 15 but is normally engaged by means of the clutch cone 16 with a corresponding clutch part on the ratchet wheel 17. The stationary pawl 18 prevents an escape of the ratchet wheel 17 when ratchet lever 19 with its pawl 20 effects a tightening of the cables 13 which in turn puts the brake shoes in action.

From the ratchet lever 19 leads a link 21 to the hand lever 22 where the driver of the vehicle may actuate the brake at will.

Figure 5:
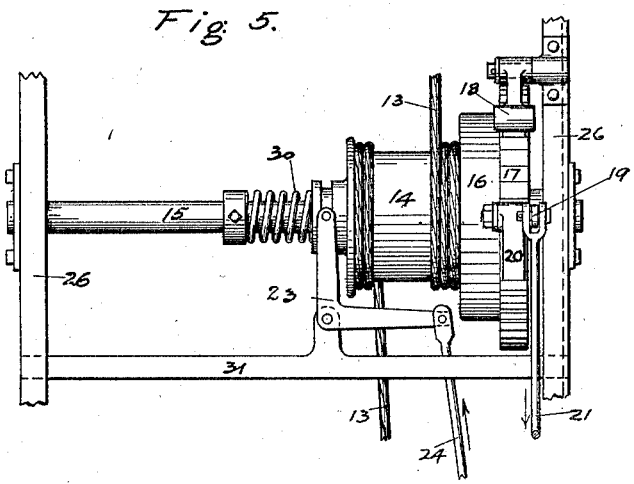
Fig. 5 is a plan of the drum, its operating means and the supporting portion of the vehicle.

The withdrawal of the brake or jack, as the case may be, is effected by means of bell crank 23, link 24 and pedal 25 (the pressure in the link being exerted in the direction of the arrow in Fig. 5), since by these elements the cable drum 14 is disengaged from the ratchet wheel 17 which allows cables 13 to unwind as the springs 5 pull the brake shoes 1 upward.

The relative position of the main frame 26 to the wheels 27 is illustrated in Figs. 1, 2 and 3 (the wheels being indicated in dotted lines). The customary axles for connecting said wheels are shown in end view in Figs. 1 and 2. Attached to the main frame 26 are the hangers 29 (Figs. 4 and 5) for the shaft 15, and the latter, besides supporting the previously described cable drum and ratchet mechanism, also holds the compression spring 30 which performs the duty of keeping the clutch part of the cable drum normally in engagement with the complemental clutch part of the ratchet wheel. One more part in Fig. 5 needs mentioning and that is the cross bar 31, which may be attached to the main frame 26 in any suitable manner provided it is adapted to furnish the pivotal support for the bell crank 23.

To complete the description of all the parts shown, it only remains to be pointed out that the brackets 32 in Figs. 1 and 3, which connect the ends of spring 4 with the main frame 26, are introduced to preserve the latter normally in a position parallel with the ground.

Having thus clearly described my invention it will be seen that my objects have been accomplished.

I claim:

1. A combined brake and jack for vehicles comprising brake shoes capable of supporting the weight of a vehicle on a roadway, toggle links connecting the brake shoes with the main springs of a vehicle, and tension springs between the ends of the main springs and the elbows of said toggles to keep the brake shoes normally in an elevated or idle position.

2. A combined brake and jack for vehicles comprising brake shoes capable of supporting the weight of a vehicle on a roadway, levers adapted to engage the brake shoes, rocker arms to operate the levers and to depress the brake shoes, and means for returning the brake shoes to idle position when said pressure is released.

GUY ALLEN ROGERS.

Witnesses:
W. S. U'REN,
J. T. CANRIGHT.

Copies of this patent may be obtained for five cents each, by addressing the "Commissioner of Patents, Washington, D. C."